(12) United States Patent
Hartline et al.

(10) Patent No.: US 7,353,423 B2
(45) Date of Patent: Apr. 1, 2008

(54) SYSTEM AND METHOD FOR IMPROVING THE PERFORMANCE OF OPERATIONS REQUIRING PARITY READS IN A STORAGE ARRAY SYSTEM

(75) Inventors: Jeffrey R. Hartline, Ithaca, NY (US); James Lee Hafner, San Jose, CA (US); Tapas Kanungo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/949,126

(22) Filed: Sep. 24, 2004

(65) Prior Publication Data

US 2006/0075290 A1 Apr. 6, 2006

(51) Int. Cl.
*G06F 11/00* (2006.01)

(52) U.S. Cl. .......................................... 714/6; 711/114

(58) Field of Classification Search ............. None
See application file for complete search history.

(56) References Cited

U.S. PATENT DOCUMENTS

| | | | |
|---|---|---|---|
| 5,315,602 A | 5/1994 | Noya et al. ................... 371/40 |
| 5,522,065 A * | 5/1996 | Neufeld ......................... 714/6 |
| 5,778,426 A | 7/1998 | DeKoning et al. .......... 711/122 |
| 6,012,123 A * | 1/2000 | Pecone et al. ............... 711/114 |
| 6,052,822 A * | 4/2000 | Kim et al. ................... 714/805 |
| 6,101,615 A * | 8/2000 | Lyons ............................ 714/6 |
| 6,125,466 A | 9/2000 | Close et al. ................ 714/758 |
| 6,195,727 B1 | 2/2001 | Islam et al. ................. 711/114 |
| 6,523,087 B2 * | 2/2003 | Busser ......................... 711/114 |
| 6,542,960 B1 | 4/2003 | Wong et al. ................. 711/114 |
| 6,766,491 B2 * | 7/2004 | Busser ......................... 714/770 |
| 6,922,752 B2 * | 7/2005 | Uysal et al. ................. 711/114 |
| 7,069,382 B2 * | 6/2006 | Horn et al. .................. 711/114 |
| 7,111,118 B2 * | 9/2006 | Mereddy et al. ............ 711/114 |
| 7,234,024 B1 * | 6/2007 | Kiselev ....................... 711/114 |

(Continued)

FOREIGN PATENT DOCUMENTS

JP 2003-215073 4/2000

OTHER PUBLICATIONS

"IBM Technical Disclosure Bulletin," vol. 36 No. 03, Mar. 1993.

(Continued)

*Primary Examiner*—Christopher McCarthy
(74) *Attorney, Agent, or Firm*—Samuel A. Kassatly; Jon A. Gibbons; Fleit Kain Gibbons Gutman Bongini & Bianco P.L.

(57) ABSTRACT

A system for improving a performance of a write process in an exemplary RAID system reduces a number of IOs required for a short write in a RAID algorithm by using a replicated-parity drive. Parity is stored on the parity portion of the disk drives. A replicated-parity drive comprises all the parity information. Parity information for each parity drive is co-located or mirrored on the replicated-parity portion of the disk drives for fast access during a read portion of the read-modify-write process. Consequently, the system accesses parity data with one seek, as opposed to P seeks in a conventional disk array system utilizing P parity drives.

12 Claims, 7 Drawing Sheets

U.S. PATENT DOCUMENTS

| | | | |
|---|---|---|---|
| 2002/0161970 A1* | 10/2002 | Busser | 711/114 |
| 2003/0046497 A1 | 3/2003 | Dandrea | 711/154 |
| 2003/0182502 A1* | 9/2003 | Kleiman et al. | 711/114 |
| 2003/0225794 A1 | 12/2003 | Soulier et al. | 707/200 |
| 2004/0049643 A1* | 3/2004 | Alavarez et al. | 711/162 |
| 2005/0086559 A1* | 4/2005 | Uysal et al. | 714/6 |
| 2005/0283655 A1* | 12/2005 | Ashmore | 714/7 |

OTHER PUBLICATIONS

"IBM Technical Disclosure Bulletin," vol. 37 No. 02A, Feb. 1994.

* cited by examiner

SYSTEM AND METHOD FOR IMPROVING THE PERFORMANCE OF OPERATIONS REQUIRING PARITY READS IN A STORAGE ARRAY SYSTEM

FIELD OF THE INVENTION

The present invention relates to the field of data storage, and particularly to disk array systems. More specifically, this invention relates to a system and associated method for reducing the number of IOs required during a write operation in a disk array system that implements a Redundant Array of Independent Disks (RAID) scheme, improving the read-modify-write performance.

BACKGROUND OF THE INVENTION

Computer systems utilize data redundancy schemes such as parity computation to protect against loss of data on a storage device. A redundancy value is computed by calculating a function of the data of a specific word size across a quantity of similar storage devices, also referenced as data drives. One example of such redundancy is exclusive OR (XOR) parity that is computed as the binary sum of the data; another common redundancy uses Reed-Solomon codes based on finite field arithmetic. A plurality of redundancy values (hereinafter referenced as parity values) are stored on a plurality of additional storage devices, also referenced as parity drives. In the case of a parity drive failure or loss of data on the parity drive, the data on the parity drive can be regenerated from data stored on the data drives. In the case of data drive failure or loss of data on the data drive, the data on the data drive can be regenerated from the data stored on the parity drives and other non-failing data drives. Data can be regenerated, for example, from the parity drives by adding the data on the remaining data drives and subtracting the result from data stored on the parity drives.

In Redundant Arrays of Independent Disk (RAID) systems, data files and related parity are striped across multiple disk drives. In storage subsystems that manage multiple hard disk drives (herein referenced interchangeably as disks or drives) as a single logical direct attached or network attached storage device (DASD/NASD), the RAID logic is implemented in an array controller of the subsystem. Such RAID logic may also be implemented in a host system in software.

Disk arrays, in particular RAID-3 and RAID-5 disk arrays, have represented accepted designs for highly available and reliable disk subsystems. In such arrays, the exclusive-OR of data from some number of disks is maintained on a redundant disk (the parity drive). When a disk fails, the data on it can be reconstructed by exclusive-ORing the data on the surviving disks and writing this data into a spare disk. Data is lost if a second disk fails before the reconstruction is complete.

The most common RAID systems are based on parity schemes to provide added fault tolerance. For illustration purposes only, the RAID-5 system is described to illustrate the invention, with the understanding that other parity-based disk array systems may alternatively be used.

To update a small piece of data in a RAID-5 system, the RAID array controller first reads the old data in that location, reads the corresponding old parity from the corresponding parity drive, and XORs (exclusive ORs) these data with the new data to generate the new parity, after which the RAID array controller can write the new data to the data drive and the new parity to the parity drive. In other terms, the RAID array controller needs to perform a read-modify-write of the data drive and the parity drive. Each read of the data drive or the parity drive requires movement of a disk arm to the data being read; this movement is referenced as a "seek". In systems with two or more parity drives, for example a RAID-6 system, one seek is required for each parity drive to read parity data during the write process.

Although this technology has proven to be useful, it would be desirable to present additional improvements, particularly since each seek requires a relatively significant amount of time in the overall write process. As a result, the read-modify-write operation imposes a performance penalty to the write command execution. What is therefore needed is a system, a computer program product, and an associated method for minimizing accesses to parity data drives by an array controller performing a write command.

SUMMARY OF THE INVENTION

The present invention satisfies this need, and presents a system, a computer program product, and an associated method (collectively referred to herein as "the system" or "the present system") for improving a read performance of parity drives during a write operation in a RAID disk array system. The present system improves the read-modify-write performance by reducing the number of IOs required for a short write in a RAID algorithm. The present system is particularly applicable to the RAID algorithms that tolerate multiple disk failures and in which each data element touches a large number of parity values on different parity drives.

The present system uses the standard number of parity drives utilized in a particular disk array system. However, at least one of the parity drives is designated as a "replicated-parity drive" that comprises all the parity information from all the parity drives. Parity information for each parity drive is co-located or mirrored on the replicated-parity drive for fast access during a read portion of the write process. For the purpose of providing data redundancy and system reliability, parity is stored on two or more parity data drives as in standard disk array systems. However, for the purpose of providing fast access with fewer IOs during the read portion of the write process, the present system replicates all the parity data on the replicated-parity drive.

The present system accesses all the parity data with a single seek, as opposed to a plurality of seeks in a conventional disk array system (i.e., P seeks in P-parity drive system). Parity data is written to separate parity drives as in conventional systems, maintaining reliability of conventional systems. However, in the present system, the parity data is also written to the replicated-parity drive. These write operations are performed in parallel. There are P write IOs issued in parallel such that P-1 are short and one is long. The long write operation comprises the replicated-parity. The time required to replicate the parity data on the replicated-parity drive is negligible compared to the time savings achieved by reducing the number of seeks during the read portion of the write process. In another embodiment, the present system replicates the parity on some of the drives. A long IO to read all the parity is split into more than one and fewer than P IOs.

The present system requires additional storage space in the replicated-parity drive to accommodate the additional copies of parity data. The additional storage space represents a small loss in efficiency of the overall disk array system.

The improved performance of the disk array system in writing data is significant in comparison to the small loss in efficiency.

BRIEF DESCRIPTION OF THE DRAWINGS

Various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
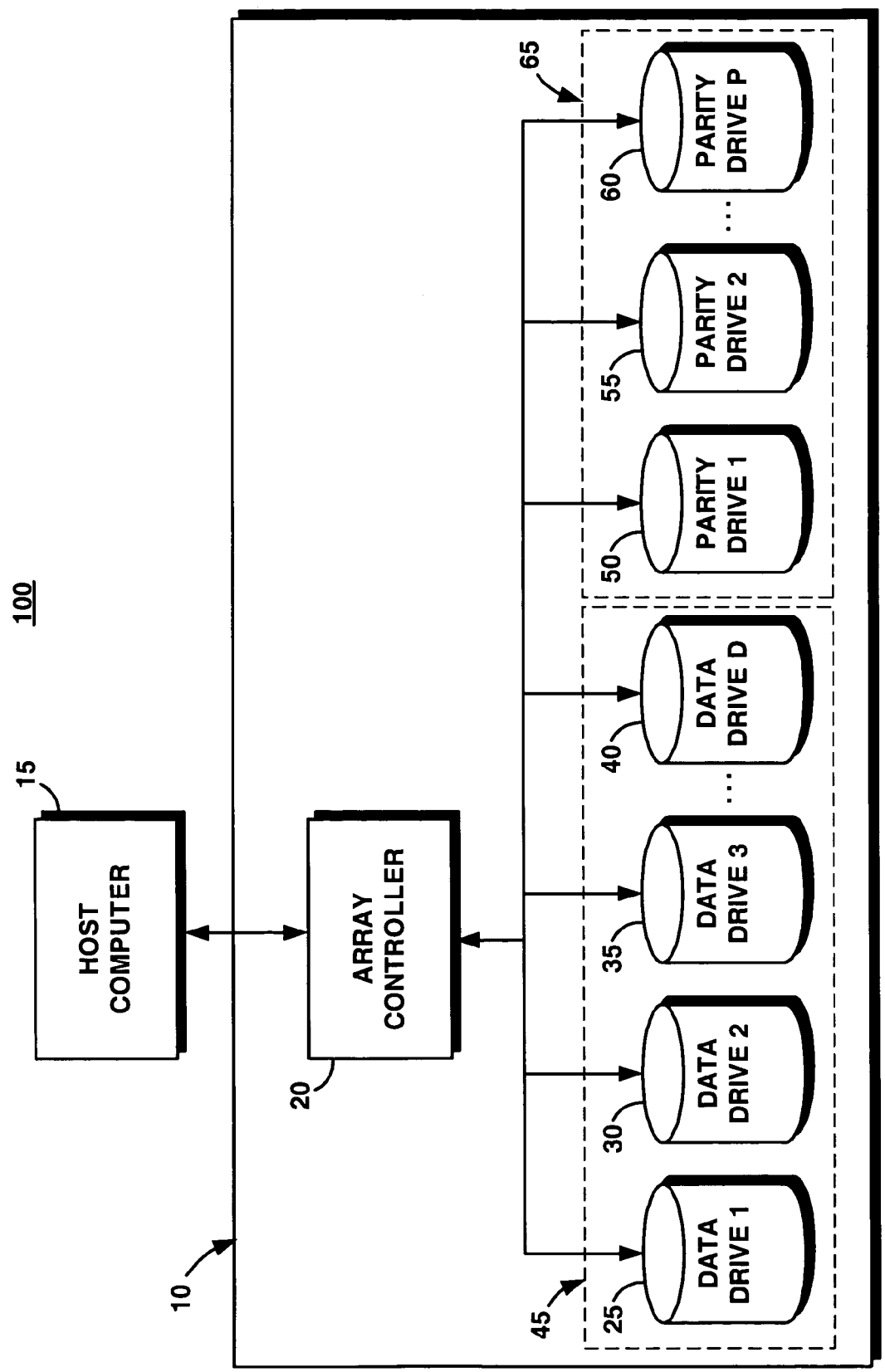
FIG. 1 is a schematic illustration of an exemplary environment in which the present system for improving read performance of parity drives during write operation in a disk array system may be used.

FIG. 1 illustrates an exemplary environment (a disk drive system 100) in which the present system and associated method (system 10) for improving read performance of parity drives during a write operation in a disk array system can be used. A host computer 15 is connected to an array controller 20 of system 10. The host computer 15 stores and receives data from the system 10. The array controller 20 stores the host data, for example, on D data drives, such as: a data drive 1, 25, a data drive 2, 30, a data drive 3, 35, through a data drive D, 40 (referenced collectively as data drives 45). The array controller stores parity in, for example, P parity drives, such as: a parity drive 1, 50, a parity drive 2, 55, through a parity drive P, 60 (referenced collectively as parity drives 65).

Figure 2:
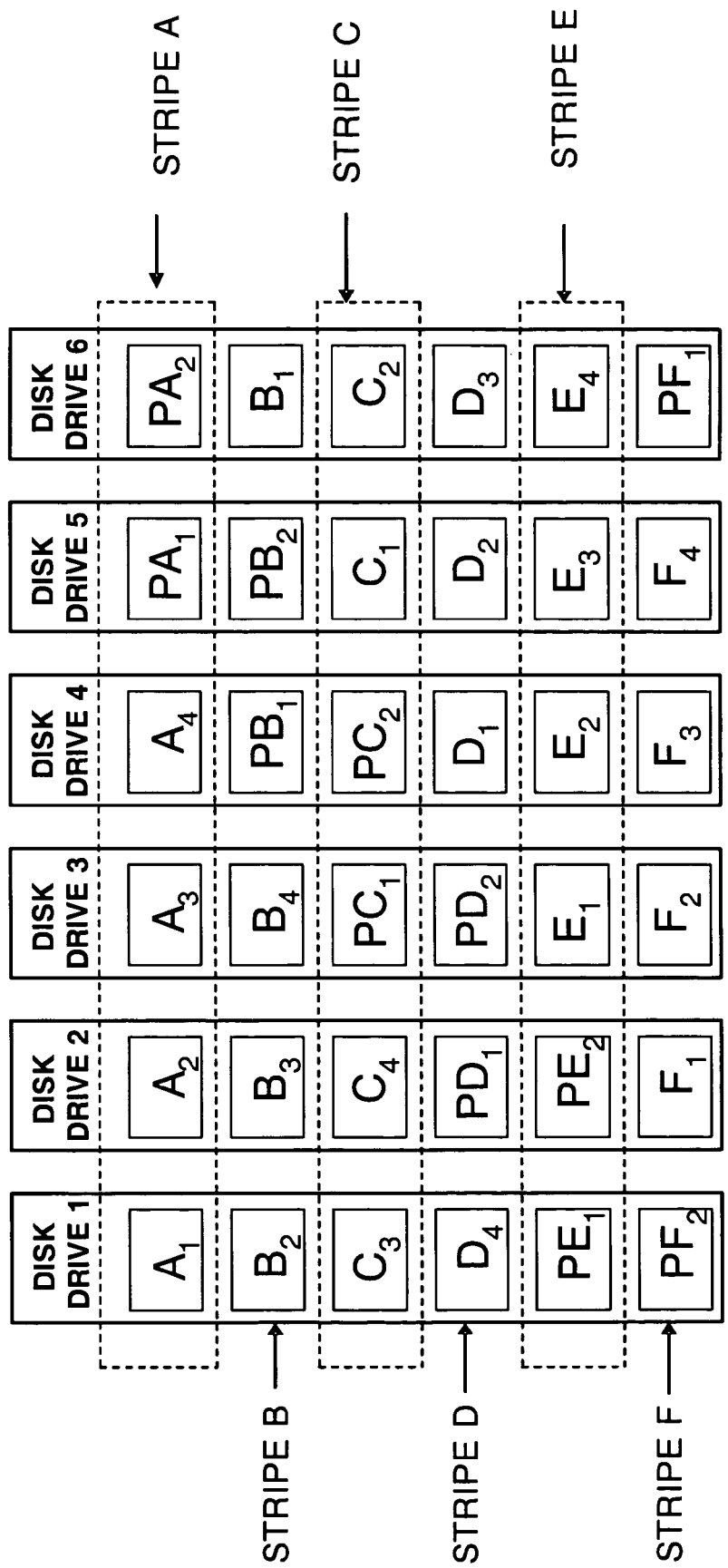
FIG. 2 is a diagram illustrating a conventional distribution of data and parity blocks, wherein the conventional stripes are arranged on seven storage devices that form part of the disk array system of FIG. 1, and wherein the stripes are labeled using a rotational mapping of the data drives and the parity drives for each stripe.

FIG. 2 illustrates an exemplary conventional RAID data layout in which four disks in each stripe are designated as data drives and two disks in each stripe are parity drives. For example, drives 1 through 4 are the data drives for stripe A and drives 5 and 6 are the parity drives for stripe A; drives 1 through 3 and drive 6 are the data drives for stripe B and drives 4 and 5 are the parity drives for stripe B. Letters Ax, Bx, Cx, Dx, Ex, and Fx are used to designate data blocks of different stripes and letter Px designates a parity block for the data blocks of its stripe. The data and parity drives for each stripe are rotated (or permuted) to the left with respect to the data and parity drives of the preceding stripe. The array controller 20 manages the data drives 225 and the parity drives 245 and thus knows the boundaries of the array data blocks and the boundaries of the parity blocks.

Figure 3:
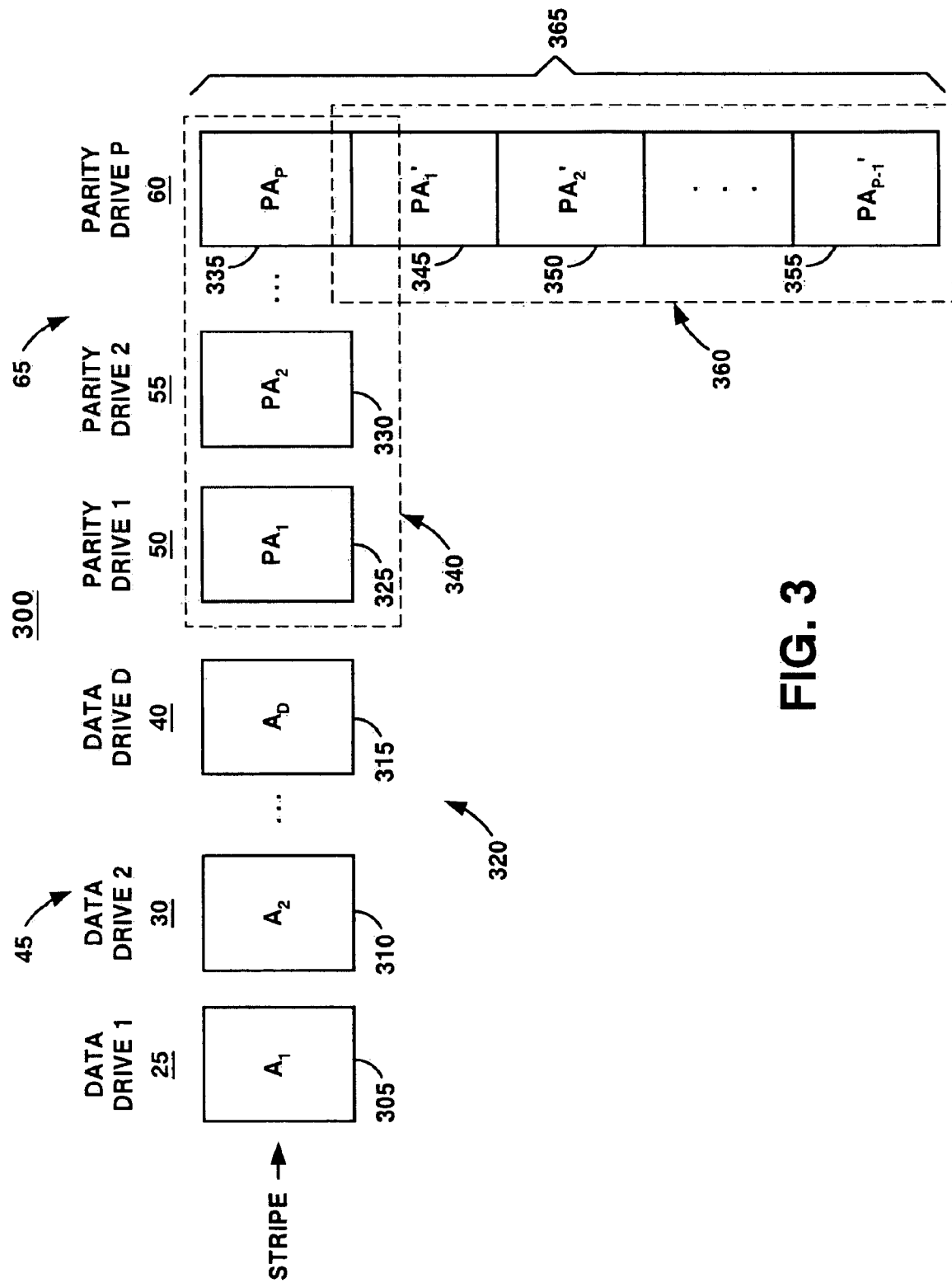
FIG. 3 is a diagram illustrating a stripe with one of the parity drives designated as a replicated-parity drive, for use in a write operation by the system of FIG. 1 on a disk array system comprising D data drives and P parity drives.

FIG. 3 illustrates a stripe 300 generated by system 10 for the disk drive system 100 of FIG. 1. Exemplary data elements are written to D data drives 45 as an $A_1$ 305, an $A_2$ 310, through an $A_D$ 315, collectively referenced as data elements 320. Parity elements are written to P parity drives 65 as a $PA_1$ 325, a $PA_2$ 330, through a $PA_P$ 335, collectively referenced as parity elements 340. The parity elements 340 excluding parity element $PA_P$ 335 are further replicated on the replicated-parity drive 60. $PA_1$ 325 is replicated as a $PA_1'$ 345, $PA_2$ 330 is replicated as a $PA_2'$ 350, etc.

The elements $PA_1'$ 345, $PA_2'$ 350, through $PA_{P-1}'$ 355 are collectively referenced as replicated elements 360. The replicated elements 360 are duplicates of parity data occurring on parity drives 65 other than the replicated-parity drive 60. The replicated elements 360 are replicated on the replicated-parity drive 60 and co-located with the parity element $PA_P$ 335 to form a strip 365. Co-locating the parity elements 340 into one strip 365 minimizes the number of seeks required to access the parity elements 340 during a write operation.

System 10 co-locates all the parity data associated with stripe 300 on one parity drive such as, for example, the replicated-parity drive 60. In the process of a write command, system 10 can locate and read all the parity data associated with stripe 300 in one seek. The stripe 300 has the same fault tolerance as a conventional stripe because each unique parity element exists on separate drives. Reliability in case of a disk failure is maintained through the use of the parity drive 1, 50, the parity drive 2, 55, etc.

Figure 4:
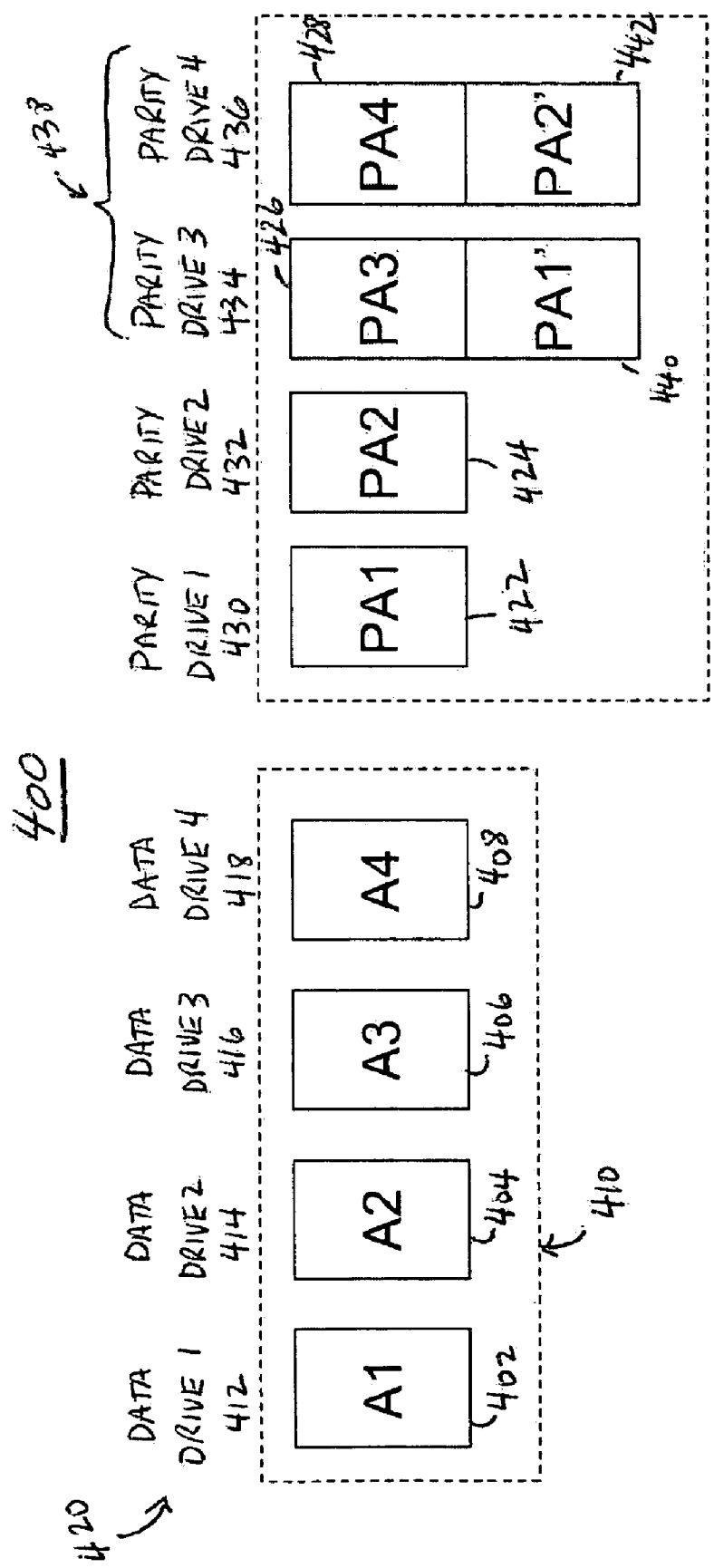
FIG. 4 is a diagram illustrating an exemplary alternative embodiment in which the mirrored parity is spread over a plurality of replicated-parity drives comprising four data drives and four parity drives, the parity drives comprising two replicated-parity drives containing mirrored parity from the remaining parity drives.

FIG. 4 illustrates another embodiment in which more than one parity drive are selected to hold some of the mirrored parity elements. For exemplary purposes only, stripe 400 comprises data elements such as an A1 402, an A2 404, an A3 406, and an A4 408 (collectively referenced as data elements 410) written to four data drives: a data drive 1, 412, a data drive 2, 414, a data drive 3, 416, and a data drive 4, 418 (collectively referenced as data drives 420). Stripe 400 further comprises parity elements such as a PA1 422, a PA2 424, a PA3 426, and a PA4 428 written to four parity drives: a parity drive 1, 430, a parity drive 2, 432, a parity drive 3, 434, and a parity drive 4, 436. The parity drive 3, 434, and the parity drive 4, 436 are replicated-parity drives (collectively referenced as replicated-parity drives 438).

The parity elements PA1 422 and PA2 424 are mirrored on the replicated-parity drives 438 as a PA1' 440 and a PA2' 442. Consequently, array controller 20 can locate and read all the parity data associated with stripe 400 in two seeks in the exemplary stripe 400. More generally, if there are P data drives of which R are replicated-parity drives, then array controller 20 can locate and read all the parity data in R seeks. In conventional write operations, array controller 20 required P seeks with short transfer length. In a preferred embodiment illustrated in FIG. 3, array controller 20 requires only one seek with a long transfer length. The alternative embodiment illustrated by example in FIG. 4 requires the array controller 20 to use R seeks with a mid-sized transfer length.

Figure 5:
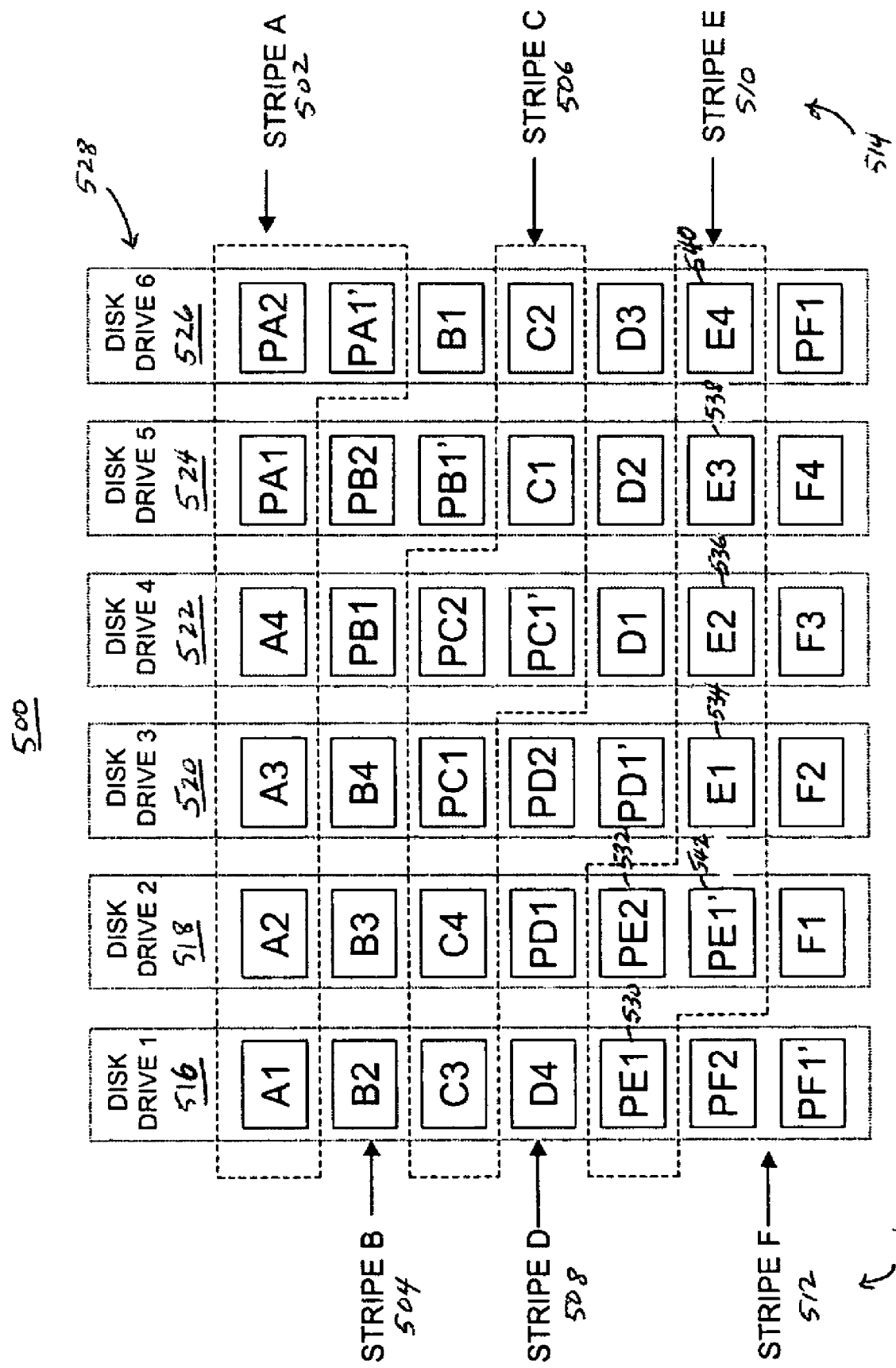
FIG. 5 is a diagram illustrating an exemplary version of an additional and optional feature of the invention in which multiple stripes are mapped onto a set of disks, utilizing a rotational mapping of the data drives and parity drives for each stripe.

In yet a further embodiment, multiple stripes with replicated-parity can be stacked as illustrated in an exemplary layout 500 of FIG. 5. Layout 500 comprises a stripe A 502, a stripe B 504, a stripe C 506, a stripe D 508, a stripe E 510, and a stripe F 512 (collectively referenced as stripes 514). Stripes 514 are mapped across a disk drive 1, 516, a disk drive 2, 518, a disk drive 3, 520, a disk drive 4, 522, a disk drive 5, 524, and a disk drive 6, 526 (collectively referenced as disk drives 528). In layout 500, each of the disk drives 528 comprises four data elements and two parity elements. Furthermore, each of the disk drives 528 is a replicated-parity drive for one of the stripes 514.

Each of the stripes 514 has its mapping of data elements to the disk drives 528 rotated (or permuted) to the left with respect to a stripe immediately above it. For example, a mapping of data elements to disk drives 508 for the stripe E 510 is permuted to the left with respect to the stripe D 508.

One of the parity elements in the stripes 514 is mirrored on a replicated-parity drive for that stripe. For example, the stripe E 510 comprises as parity elements a PE1 530 and a PE2 532. The stripe E 510 further comprises as data elements an E1 534, an E2 536, an E3 538, and an E4 540. Parity element PE1 530 is replicated on the disk drive 2, 518 as a PE1' 542. The disk drive 2, 518, is the replicated-parity drive for the stripe E 510. The more general case of D data drives and P parity drives utilizing either a preferred embodiment (illustrated by layout 300 of FIG. 3) with one replicated-parity drive or an embodiment with R replicated-parity drives (illustrated by layout 400 of FIG. 4) should be clear to someone skilled in the art. The embodiment illustrated by FIG. 5 provides a more uniform utilization of the disk capacity and a more uniform utilization of disk with better load balancing.

Figure 6:
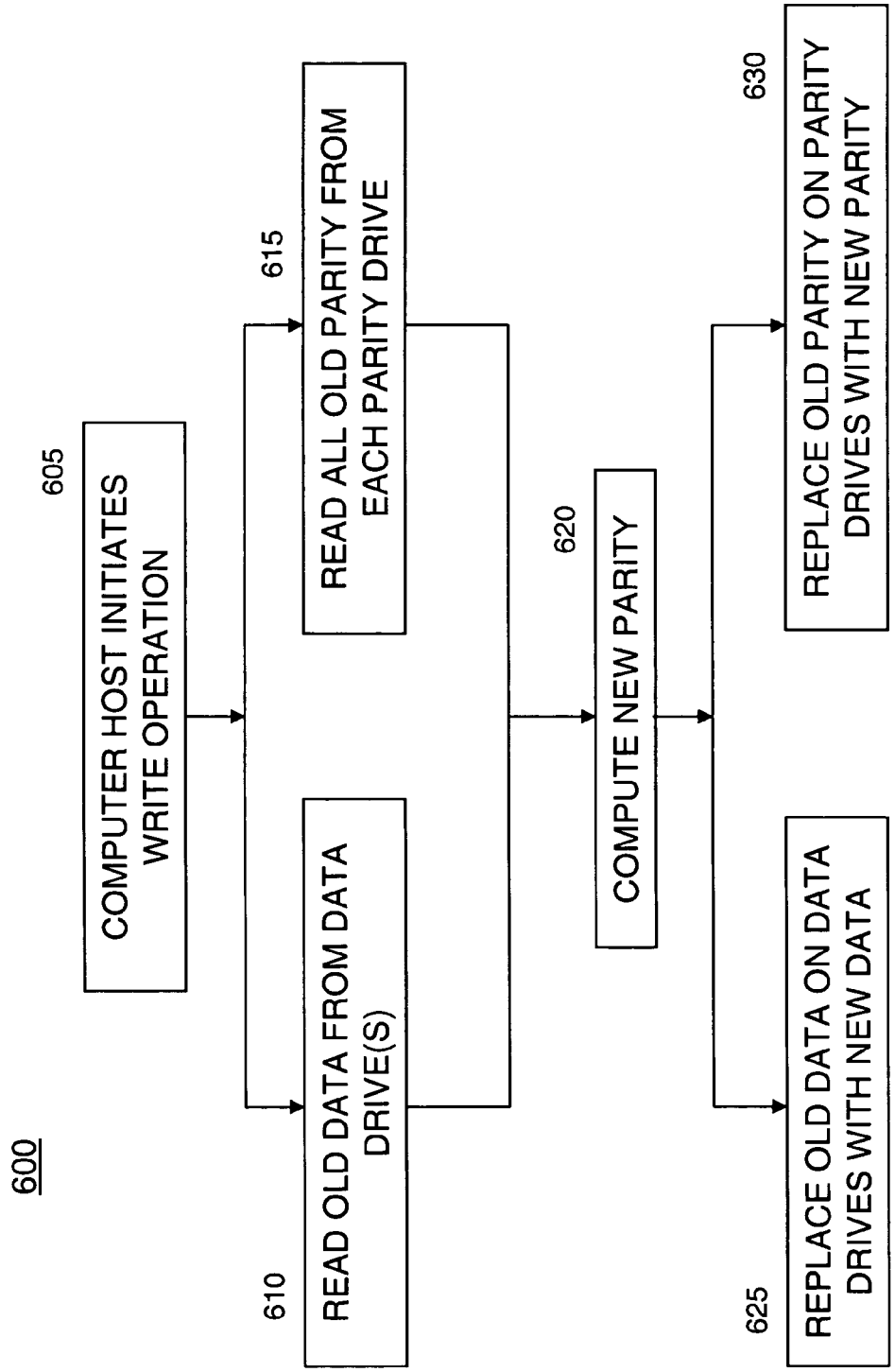
FIG. 6 is a process flow chart illustrating a conventional method of operation of a conventional array controller executing a conventional write operation.

FIG. 6 illustrates, for comparison purpose, a method 600 of a conventional write operation in updating data. The host computer 15 initiates a conventional write operation (step 605). The array controller reads old data from at least one of the data drives (step 610). In parallel, before, or after the step 610, the array controller reads all old parity from each parity drive (step 615). The array controller computes new parity (step 620). The array controller replaces old data on the data drive(s) read in step 610 with new data (step 625) and concurrently replaces old parity on the parity drives with new parity (step 630).

Figure 7:
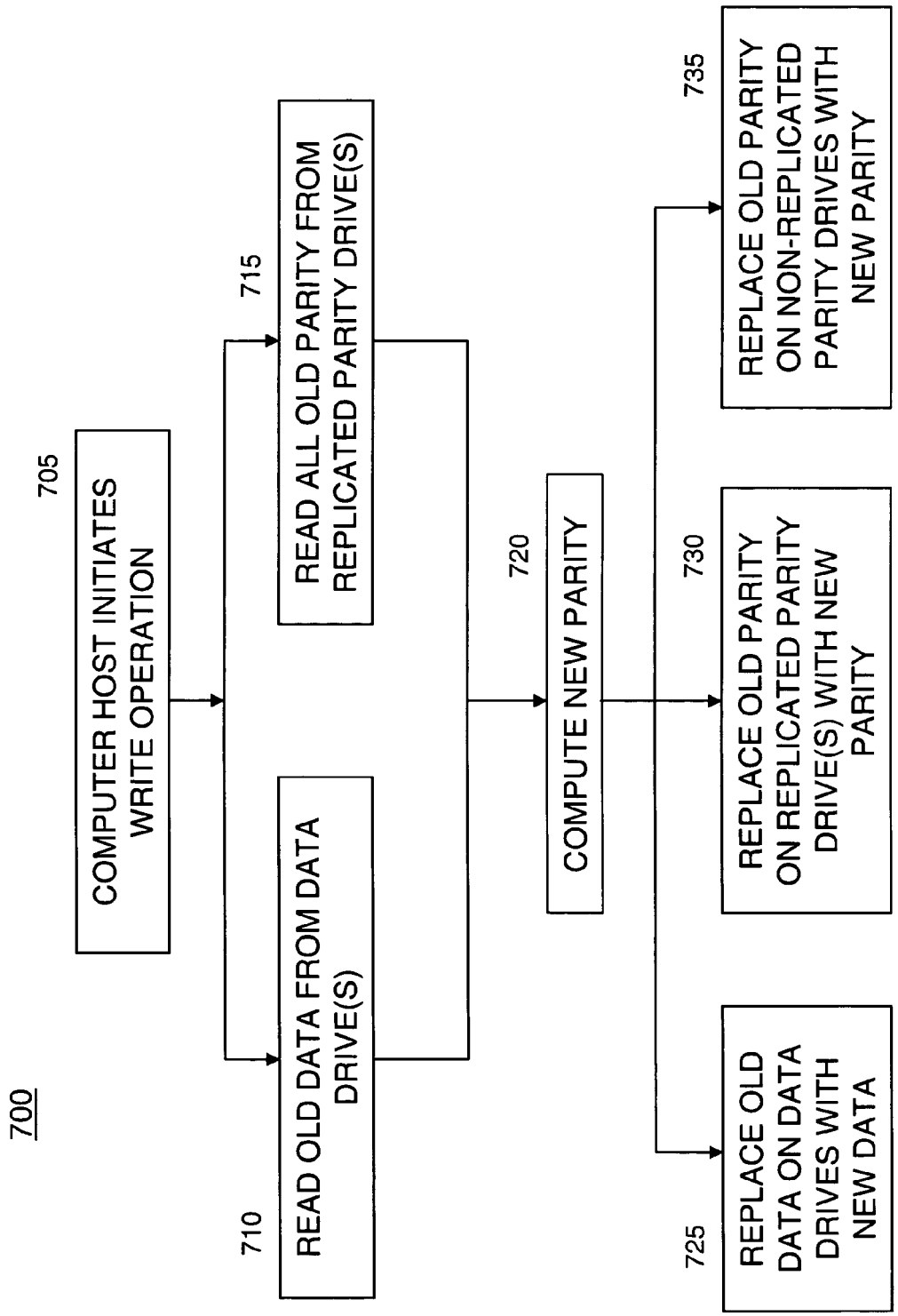
FIG. 7 is a process flow chart illustrating a method of operation of an array controller executing the write operation for use in system of FIG. 1.

FIG. 7 is a process flow chart illustrating a method 700 of a write operation of system 10 in updating data on data drives. The host computer 15 initiates a write operation (step 705). The array controller 20 reads old data from at least one of the data drives (step 710). In the exemplary layout 300 of FIG. 3 and the system 10 of FIG. 1, the array controller reads data from at least one of the data drives 45. In the exemplary layout 400 of FIG. 4, the array controller reads data from at least one of the data drives 420. In the layout 500 of FIG. 5, the array controller 20 reads data from the data portion of at least one of the disk drives 528.

The array controller 20, in parallel, before, or after step 710, reads all the old parity from the replicated-parity drive(s), the parity drive(s) that comprises all the parity data (step 715). In FIG. 3, the replicated-parity drive comprises the replicated-parity drive 60. In FIG. 4, the replicated-parity drives comprise the replicated-parity drives 438. In FIG. 5, the replicated-parity drives comprise the disk drives 528.

The array controller 20 computes new parity (step 720). The array controller 20 replaces old data on the data drive(s) read in step 710 (step 725). For example, old data is replaced with new data on the data drive(s) 45 (FIG. 3), the data drive(s) 420 (FIG. 4), or the data portion of the disk drive(s) 528 (FIG. 5). In parallel, before, or after step 725, the array controller 20 replaces old parity on replicated parity drives with new parity (step 730). For example, old parity is replaced with new parity on the replicated-parity drive 60 (FIG. 3), the replicated-parity drives 438 (FIG. 4), or the replicated-parity portion of the disk drives 528 (FIG. 5). In parallel, before, or after step 725 and step 730, the array controller replaces old parity on non-replicated parity drives with new parity (step 735). For example, in FIG. 3 old parity is replaced with new parity on the parity drive 1, 50, the parity drive 2, 55, etc. Old parity is replaced with new parity on the parity drive 1, 430, and the parity drive 2, 432, in FIG. 4. Old parity is replaced with new parity on the parity portion of the disk drives 528 in FIG. 5.

As illustrated by method 700 and an embodiment illustrated in FIG. 3, system 10 performs seeks to locate data on at least one of the D data drives and one parity drive during a write operation. In comparison, a conventional array controller performs seeks to locate data on at least one of the D data drives and P parity drives during a conventional write operation. Consequently, system 10 performs a write operation with P-1 fewer seeks than a conventional system. While a read of the parity on the replicated-parity drive requires more time than a read of just one parity element, the time saved by eliminating P-1 seeks can be significant.

In yet another scenario where the present invention applies, the host computer 15 initiates a read operation to the array controller, where the addressed data is on a failed disk. In this situation, the array controller may need to read data from some of the data drives and some or all of the parity data from the parity drives. In the conventional operation, the array controller reads the required parity using one 10 seek for each parity drive. In the present system, the array controller can read the required parity in one 10 seek to the replicated parity drive. Consequently, system 10 performs this type of operation with fewer seeks than a conventional system. The present invention improves upon a conventional system in any situation where the conventional operation requires the reading of parity from a plurality of parity drives.

It is to be understood that the specific embodiments of the invention that have been described are merely illustrative of certain applications of the principle of the present invention. Numerous modifications may be made to the system and method for improving read performance of parity drives during write operation in a disk array system described herein without departing from the spirit and scope of the present invention.

Storage systems have been designed wherein the storage devices are nodes in a network. Such systems may also use RAID type algorithms for data redundancy and reliability. The present invention is applicable to these systems as well, though the description herein is focused on the disk array. It should be clear to someone skilled in the art how to extend the invention to the network node application or other systems built from storage devices other than disks.

While the present invention is described for illustration purpose only in relation to a RAID system, it should be clear that the invention is applicable as well to, for example, to any system in which more than one parity element of a stripe is stored in more than one parity drive or other storage device such as networked node. It should be clear to one skilled in the art that the invention can also be used for other operations (e.g., operations that rebuild lost data) in the storage system that require read access to the parity data. For example, other operations can occur in the storage system where a read access to the parity is required, but no read access to a data element is required.

What is claimed is:

1. A method of improving read performance of a plurality of parity storage devices during an operation in a storage system, comprising:
    selecting one or more parity storage devices;
    designating each selected parity storage device as a replicated-parity device;
    writing a plurality of data elements and a plurality of parity elements to a stripe in the storage system;
    for each replicated-parity storage device, replicating the parity elements in the stripe to form a plurality of mirrored parity elements on the replicated-parity device;
    associating the replicated-parity device with the stripe;
    reading the mirrored parity elements from the replicated-parity device during the operation, using one IO access to the replicated-parity device; and
    rotating permuted stripes within the storage system with respect to a preceding permuted stripe, wherein the rotating comprises aligning at least some of the data elements with the parity elements, and further aligning at least some of the data elements with the mirrored parity elements.

2. The method of claim 1, wherein rotating the permuted stripes comprises aligning at least some of the data elements with the parity elements, and further aligning at least some of the parity elements with the mirrored parity elements.

3. The method of claim 1, wherein the storage system comprises a plurality of disks in a disk array storage system.

4. The method of claim 1, wherein the storage system comprises a plurality of storage nodes in a storage network and a plurality of storage nodes.

5. The method of claim 1, wherein the mirrored parity elements are located contiguously on the replicated-parity device.

6. The method of claim 1, wherein replicating the parity elements on the replicated-parity device is implemented substantially concurrently with writing the parity elements onto the stripe.

7. A method of improving read performance of parity portions of a plurality of storage device during an operation, comprising:
    selecting at least some of the parity portions;
    designating each selected parity portion as a replicated-parity portion;
    writing a plurality of data elements and a plurality of parity elements to a stripe in a plurality of storage devices;
    for each replicated-parity portion, replicating the parity elements in the stripe to form a plurality of mirrored parity elements on the replicated-parity portion;
    associating the replicated-parity portion with the stripe;
    reading the mirrored parity elements from the replicated-parity portion during the operation, using one IO access to the replicated-parity portion; and
    rotating permuted stripes within the storage system with respect to a preceding permuted stripe, wherein the rotating comprises aligning at least some of the data elements with the parity elements, and further aligning at least some of the data elements with the mirrored parity elements.

8. The method of claim 7, wherein the storage system comprises a plurality of disks in a disk away storage system.

9. The method of claim 7, wherein the storage system comprises a plurality of storage nodes in a storage network and a plurality of storage nodes.

10. The method of claim 7, wherein the mirrored parity elements are located contiguously on the replicated-parity portion.

11. The method of claim 7, wherein replicating the parity elements on the replicated-parity portion is implemented substantially concurrently with writing the parity elements onto the stripe.

12. The method of claim 7, wherein rotating the permuted stripes comprises aligning at least some of the data elements with the parity elements, and further aligning at least some of the parity elements with the mirrored parity elements.

* * * * *